(12) United States Patent
Wrighton et al.

(10) Patent No.: US 12,079,595 B2
(45) Date of Patent: Sep. 3, 2024

(54) RUNTIME SUPPORT FOR ROLE TYPES THAT EXTEND UNDERLYING TYPES

(71) Applicant: Microsoft Technology Licensing, LLC, Redmond, WA (US)

(72) Inventors: David Charles Wrighton, Redmond, WA (US); Julien David Couvreur, Kirkland, WA (US); Stephen Harris Toub, Winchester, MA (US); Mads Torgersen, Seattle, WA (US); Jared Porter Parsons, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/853,004

(22) Filed: Jun. 29, 2022

(65) Prior Publication Data

US 2024/0004616 A1 Jan. 4, 2024

(51) Int. Cl.
*G06F 8/20* (2018.01)
(52) U.S. Cl.
CPC ..................... *G06F 8/24* (2013.01)
(58) Field of Classification Search
CPC ........................................................ G06F 8/24
USPC ................................. 717/101–120, 164–178
See application file for complete search history.

(56) References Cited

U.S. PATENT DOCUMENTS

| | | | | |
|---|---|---|---|---|
| 5,872,973 A * | 2/1999 | Mitchell | ................. | G06F 9/465 719/330 |
| 6,016,392 A * | 1/2000 | Jordan | ................. | G06F 9/4488 719/328 |
| 6,378,001 B1 * | 4/2002 | Aditham | ................. | G06Q 10/06 709/205 |
| 6,523,027 B1 * | 2/2003 | Underwood | ............. | G06F 9/465 |
| 6,529,948 B1 * | 3/2003 | Bowman-Amuah | | G06F 9/4493 709/219 |
| 7,089,530 B1 * | 8/2006 | Dardinski | .............. | G05B 15/02 717/109 |
| 7,757,210 B1 * | 7/2010 | Krueger | .................... | G06F 8/24 717/109 |
| 7,822,826 B1 * | 10/2010 | Savchenko | ............... | G06F 8/61 709/219 |
| 8,055,907 B2 * | 11/2011 | Deem | ....................... | G06F 9/44 713/193 |

(Continued)

OTHER PUBLICATIONS

Huang et al, "Dynamic Code Management: Improving Whole Program Code Locality in Managed Runtimes", ACM, pp. 133-143 (Year: 2006).*

(Continued)

*Primary Examiner* — Anil Khatri
(74) *Attorney, Agent, or Firm* — Workman Nydegger (57) ABSTRACT

Utilizing role types that extend underlying types. Within a program definition, a computer system identifies a statement assigning an object of an underlying type to a role type that extends the underlying type. The underlying type implements a first interface, and the role type implements a second interface. Based on the role type extending the underlying type, the computer system assigns the object of the underlying type to the role type. Based on assigning the object of the underlying type to the role type, the role type is usable to interact with the object of the underlying type using both the first interface and the second interface.

20 Claims, 3 Drawing Sheets

(56) References Cited

U.S. PATENT DOCUMENTS

| | | | | |
|---|---|---|---|---|
| 8,065,668 B2 * | 11/2011 | Bosworth | ............... | G06F 8/437 |
| | | | | 717/120 |
| 8,510,530 B1 * | 8/2013 | Jacobs | ................. | G06F 9/5022 |
| | | | | 711/170 |
| 8,713,515 B1 * | 4/2014 | Biggerstaff | ............... | G06F 8/72 |
| | | | | 717/137 |
| 8,752,011 B2 * | 6/2014 | Dewan | ................... | G06F 9/451 |
| | | | | 717/113 |
| 2004/0194058 A1 * | 9/2004 | Meijer | ................... | G06F 8/437 |
| | | | | 714/48 |
| 2009/0234804 A1 | 9/2009 | Whitechapel et al. | | |
| 2014/0282442 A1 | 9/2014 | Hoban et al. | | |

OTHER PUBLICATIONS

Fumero et al, "Runtime Code Generation and Data Management for Heterogeneous Computing in Java", ACM, pp. 16-26 (Year: 2015).*
Canning et al, "Interfaces for Strongly-Typed Object-Oriented Programming", ACM, pp. 457-467 (Year: 1989).*
Peterson et al, "Implementing Type Classes", ACM, pp. 227-236 (Year: 1993).*
Wasserrab et al, "An Operational Semantics and Type Safety Proof for Multiple Inheritance in C++", ACM, pp. 345-362 (Year: 2006).*
Kawaguchi et al, "Type-based Data Structure Verification", ACM, pp. 304-315 (Year: 2009).*
"International Search Report and Written Opinion Issued in PCT Application No. PCT/US23/023452", Mailed Date: Sep. 18, 2023, 14 Pages.

* cited by examiner

RUNTIME SUPPORT FOR ROLE TYPES THAT EXTEND UNDERLYING TYPES

BACKGROUND

In computing, managed code is code whose execution is managed by a runtime, rather than executing directly at a processor. An example of a managed runtime is the Common Language Runtime (CLR), which is part of .NET, both from MICROSOFT CORPORATION. Another example of a managed runtime is the JAVA Runtime Environment (JRE) from ORACLE CORPORATION. Managed runtimes implement various kinds of types that can be assigned to objects. . NET for example, has runtime-level support for two general categories of types: value types and reference types. Objects with a value type (e.g., System.Int32) are allocated to a program's stack memory or are contained in something else (e.g., a reference type). Objects with a reference type (e.g., classes such as System.String and interfaces such as System.IFormattable), on the other hand, are typically allocated to a program's heap memory, with a reference to that object being stored on the program's stack.

At times, a program may need to pass an object of one type to something that takes an object of another type. For example, the program may need to pass an instance of an "Animal" class to a method that accepts an "IPerson" interface. Classically, these situations have been dealt with by creating wrapper classes using a "delegation" or "facade" pattern. Using these patterns, a developer creates a new wrapper class that wraps the "Animal" instance and that implements the IPerson interface, including writing "glue" code to implement all of the IPerson methods. As an example, to wrap an Animal as an IPerson, a developer might start by declaring a class, declaring a field on the class to store that Animal, and declaring a constructor on that class that accepts the Animal and that stores it into the field. For instance, using C #syntax:

```
private class AnimalPerson : Iperson
{
    private readonly Animal _animal;
    public AnimalPerson(Animal animal)
    {
        if (animal is null) throw new
            ArgumentNullException(nameof(animal));
        _animal = animal;
    }
    ...
}
```

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for utilizing role types that extend underlying types, the method including: within a program definition, identifying a statement assigning an object of an underlying type to a role type that extends the underlying type, wherein: the underlying type implements a first interface, and the role type implements a second interface; and based on the role type extending the underlying type, assigning the object of the underlying type to the role type, wherein, based on assigning the object of the underlying type to the role type, the role type is usable to interact with the object of the underlying type using both the first interface and the second interface.

In some aspects, the techniques described herein relate to a computer system for utilizing role types that extend underlying types, including: a processor; and a computer storage media that stores computer-executable instructions that are executable by the processor to cause the computer system to at least: within a program definition, identify a statement assigning an object of an underlying type to a role type that extends the underlying type, wherein: the underlying type implements a first interface, and the role type implements a second interface; and based on the role type extending the underlying type, assign the object of the underlying type to the role type, wherein, based on assigning the object of the underlying type to the role type, the role type is usable to interact with the object of the underlying type using both the first interface and the second interface.

In some aspects, the techniques described herein relate to a computer program product including a computer storage media that stores computer-executable instructions that are executable by a processor to cause a computer system to utilize role types that extend underlying types, the computer-executable instructions including instructions that are executable by the processor to cause the computer system to at least: within a program definition, identify a statement assigning an object of an underlying type to a role type that extends the underlying type, wherein: the underlying type implements a first interface, and the role type implements a second interface; and based on the role type extending the underlying type, assign the object of the underlying type to the role type, wherein, based on assigning the object of the underlying type to the role type, the role type is usable to interact with the object of the underlying type using both the first interface and the second interface.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Existing solutions for facilitating passing objects of one type to something that takes another type—such as creating wrapper classes using delegation or facade patterns as described in the Background—have significant drawbacks. For example, writing a wrapper class requires that a developer write the "glue" code to map from one type to another, such as code that delegates from the method(s) of one type (e.g., an IPerson interface) to the method(s) of another type (e.g., an Animal class). Additionally, creating instances of wrapper classes means the creation of wrapper objects in memory. For instance, referring to the example wrapper class discussed in the Background, a wrapper instance (e.g., an instance of the class AnimalPerson) and an underlying Animal instance (e.g., _animal) would be two distinct objects in memory. As a result, a program cannot compare an instance of a wrapper class to an instance of a wrapped class by reference, because those instances are stored at different locations in memory.

The embodiments herein overcome these drawbacks by providing runtime-level support for a new general category of types (in addition to, e.g., value types and reference types), which is referred to herein as a "role" type, though other names could be used. The role type described herein enables any code to extend another underlying type (whether it be, e.g., a reference type such as a class or interface, or a value type), without needing any knowledge of that underlying type's implementation, and without modifying or overriding that underlying type's implementation. Thus, the role type described herein allows arbitrary code to extend an underlying type with additional members and interface implementations, while retaining the underlying type's existing members and interface implementations. Stated differently, the role type described herein allows arbitrary code to provide additional API surface into an underlying type, without modifying or overriding the underlying type's existing API surface. Thus, an instance of a role type has the API surface of the underlying type it extends, plus the new API surface added by the role type. Because role types add API surface to underlying types, while retaining the underlying type's existing API surface, a guiding principle of role types is that anything a program can with an underlying type, it can also do with a role type that extends the underlying type.

In contrast to wrapper classes, a role type declaration does not include glue code to implement the methods in the underlying type's existing API surface. This is because a role type extends an underlying type with additional API surface, without modifying or overriding the underlying type's existing API surface. This is also because the embodiments herein extend a runtime understand the role type, including using the role type to treat the underlying type it extends as something else (e.g., based on the additional API surface added by the role type). As such, role types are easier for developers to implement than wrapper classes, and their implementation is less error-prone. For instance, as will be evident from the examples contained herein, the kind of wrapper code demonstrated in the Background (e.g., which declares a field on a new AnimalPerson class to store an underlying Animal instance, and which declares a constructor on that class that accepts the Animal instance and stores it into the field) is not necessary with role types.

Additionally, in contrast to wrapper classes, through runtime support an instance of a role type can have reference equality with an instance of an underlying type it extends. For example, in embodiments, an instance of an underlying type can be cast to a role type that extends it. In embodiments, this results in the runtime performing a "boxing" operation that preserves reference identity, such that the same instance cast to a role can be observed to still be the same object.

Notably, a role type that extends an underlying type, as described herein, is distinct from conventional inheritance, in which one type inherits from another type. This is because a role type does not modify or override the underlying type's existing API surface. For example, in some languages, such as C# (pronounced "see-sharp"), a particular type can be declared as "sealed", meaning that it is the final implementation of the type, and cannot therefore be inherited from further. In these languages, a given type can only be inherited from if it is not sealed. By contrast, since role types extend underlying types with additional API surface, without modifying or overriding the underlying type's existing API surface (and potentially modifying the way the underlying type behaves), a role type can extend both sealed and unsealed types. Thus, role types enable flexibility not possible with inheritance.

Figure 1A:
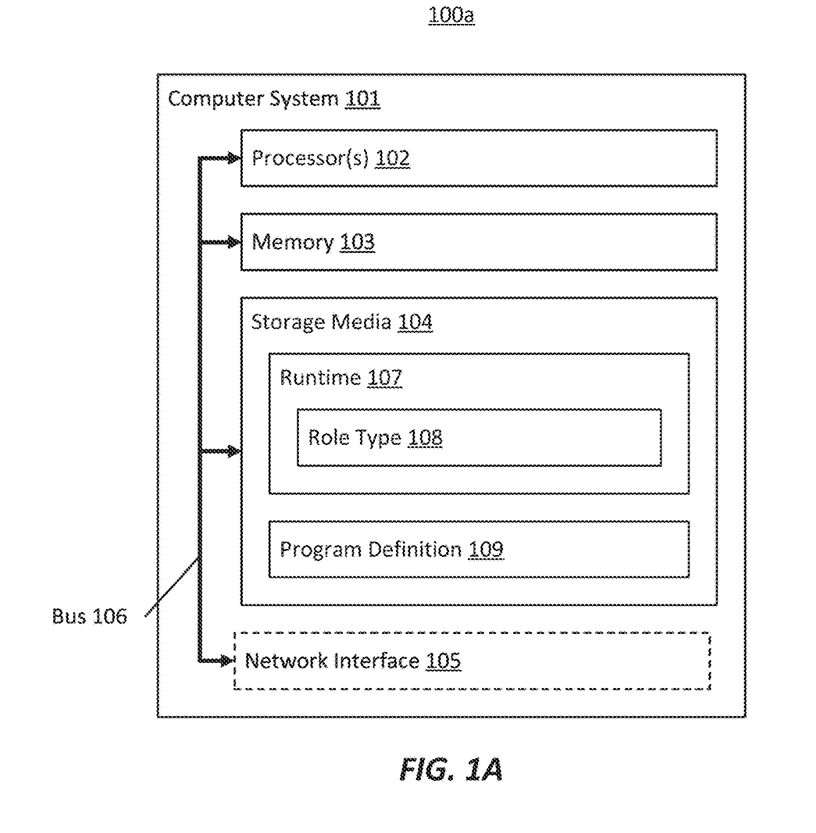
FIG. 1A illustrates an example computer architecture that provides runtime support for role types that extend underlying types.

FIG. 1A illustrates an example 100a of a computer architecture that provides runtime support for role types that extend underlying types. As shown, example 100a includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), all interconnected by a bus 106. As shown, computer system 101 may also include a network interface 105 (e.g., one or more network interface cards) for interconnecting to one or more other computer systems via a network.

The storage media 104 is illustrated as storing computer-executable instructions implementing at least a runtime 107, which in turn includes a role type component 108. The runtime 107 manages execution of code defined in a program definition 109 which, in embodiments, includes source code (e.g., C #source code, JAVA source code, and the like) and/or intermediate language code (e.g., contained in a distributable executable image). In embodiments, the role type component 108 extends the runtime 107 to provide runtime-level support for a role type which, as mentioned already, is new general type category (e.g., in addition to value types and reference types). Thus, the role type component 108 enables the runtime 107 to manage the execution of any program definition 109 that includes statements declaring a role type, and statements creating and acting on instances of the role type.

Figure 1B:
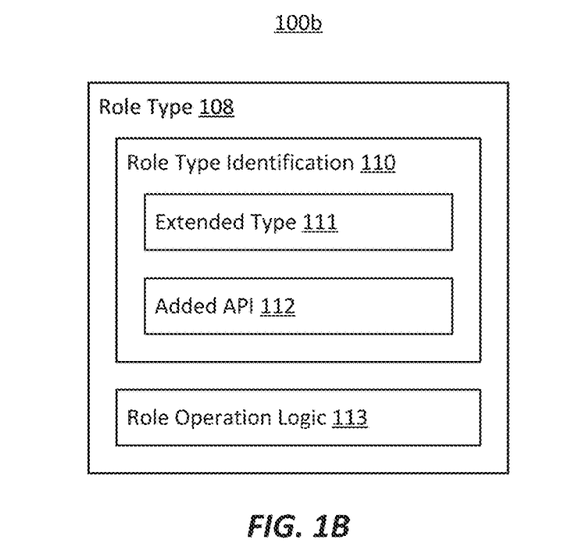
FIG. 1B illustrates an example of internal components of role type component.

FIG. 1B illustrates an example 100b of internal components of the role type component 108 of FIG. 1A. Each internal component (e.g., role type identification component 110, role operation logic 113) depicted in FIG. 1A represents various functionalities that the role type component 108 might implement in accordance with various embodiments described herein. It will be appreciated, however, that the depicted components—including their identity and arrangement—are presented merely as an aid in describing example embodiments of the role type component 108.

The role type identification component 110 represents functionality for identifying a role type declaration, and use of instances thereof, within a program definition 109. As mentioned, in embodiments a role type enables any code to extend another underlying type with additional members and interface implementations, thereby adding additional API surface to the underlying type. Thus, the role type identification component 110 is illustrated is including an extended type component 111 for identifying an underlying type that a given role type extends, and an added API component 112 for identifying new APIs (e.g., methods and interfaces) that the role type adds to the underlying type.

In various embodiments, a role type has one or more of the following characteristics. In at least one embodiment, role types have a new base type that identifies role types. For example, when implemented in .NET, role types may have a base type, System.Role<TUnderlyingType>, where TUnderlyingType is a generic for the underlying type that the role type extends. In at least one embodiment, role types are sealed, such that they cannot be inherited from. In at least one embodiment, role types have an associated boxed role type, which cannot be directly referred to by name. In at least one embodiment, role types do not support interface contracts, but their associated boxed types do. In embodiments, calls to virtual methods (e.g., using the callvirt instruction in .NET) cannot be used with unboxed role types, but they can be used on boxed role types. In at least one embodiment, role types can have methods of their own, but cannot have fields of their own. In at least one embodiment, role types re-implement all the interfaces of the underlying type without requiring developers to write glue code, e.g., by forwarding to the underlying type through using constrained calls.

Example 1 demonstrates embodiments of a role type declaration using C #syntax:
   class UnderlyingType:BaseType, Interface1 { . . . }
   role MyRole:UnderlyingType, Interface2 { . . . }

EXAMPLE 1

Here, using the 'role' keyword (though other keywords could be used), Example 1 declares a new role type, MyRole. The MyRole role extends the class UnderlyingType and implements an interface, Interface2 (though it could implement one or more additional interfaces as well). Example 1 also shows that the UnderlyingType class inherits from BaseType, and implements an interface, Interface1. Thus, the MyRole type extends instances of UnderlyingType, so that they implement both Interface1 and Interface2. This means that, using the MyRole type, instances of UnderlyingType can now be used with something, such as a method, that requires Interface2. While UnderlyingType is a class in this example, in embodiments it could be an interface, a class, or a struct. Additionally, the ellipses indicate that each declaration shown can include additional statements; in the case of the declaration of the MyRole role, these statements may define one or more methods that, for example, implement Interface2.

Example 2 demonstrates a more concrete role type declaration, again using C #syntax:
   class Dog:Animal, IDog { . . . }
   role DogsArePeopleToo:Dog, IPerson { . . . }

EXAMPLE 2

In Example 2, the DogsArePeopleToo role extends the underlying type, Dog (which in turn inherits from the Animal base type), to include an IPerson interface. Thus, instances of the Dog class that are extended by the DogsArePeopleToo role retain all the API surface of the Dog class (e.g., the IDog interface), but also gain the additional API surface of the DogsArePeopleToo role—including the IPerson interface. As a result, these instances can be consumed by entities (e.g., methods) that require an IPerson interface.

Figure 2:
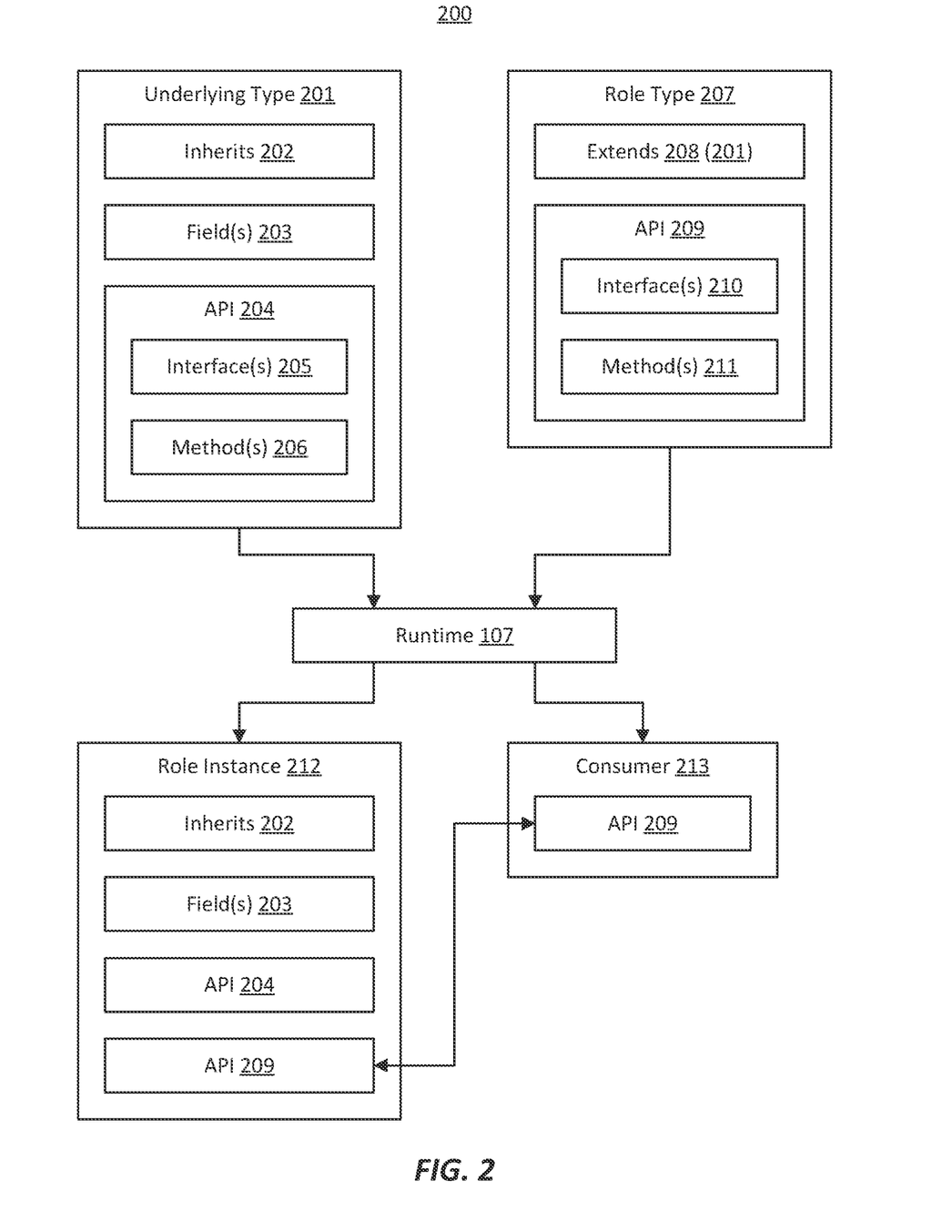
FIG. 2 illustrates an example of extending an underlying type with the application programming interface (API) surface of a role type.

FIG. 2 illustrates an example 200 of extending an underlying type with the API surface of a role type. Example 200 includes an underlying type 201. In example 200, the underlying type 201 inherits from a base type (inherits 202), includes one or more fields (field(s) 203), and defines a base API surface (API 204). As shown, this base API surface can include one or more interfaces (interface(s) 205) and/or one or more methods (method(s) 206). In one example, the underlying type 201 is a Dog class that inherits from an Animal class, and that defines a base API surface that implements an IDog interface.

Example 200 also includes a role type 207. As shown, the role type 207 extends an underlying type (extends 208), and is indicated as extending underlying type 201. Additionally, the role type 207 defines an extended API surface (API 209). As shown, this extended API surface can include one or more interfaces (interface(s) 210) and/or one or more methods (method(s) 211). In one example, the role type 207 is a DogsArePeopleToo role that extend the Dog class, and defines an extended API surface that implements an iPerson interface.

Example 200 also shows that, through action of at least the runtime 107 (e.g., based on the role type component 108), an instance of the role type 207 (i.e., role instance 212) extends the underlying type 201. In particular, the underlying type 201, the role instance 212 has the same inheritance as the underlying type 201 (inherits 202), has the same fields as the underlying type 201 (field(s) 203), and includes the base API surface of the underlying type 201 (API 204). However, the role instance 212 also includes the extended API surface of the role type 207 (API 209). As a result, example 200 shows that a consumer 213 that requires the API 209 of the role type 207 can consume the role instance 212 (including, for example, the field(s) 203 of the underlying type 201). In one example, the consumer 213 is a method that accepts an iPerson interface and, by virtue of the extended API surface (API 209) added by the role type 207, this consumer 213 can consume an instance of the Dog underlying type (e.g., when the instance of the Dog underlying type is cast into the role type 207).

Returning to FIG. 1B, the role operation logic 113 represents functionality for extending the runtime 107 to understand role types and perform operations that involve role types. In embodiments, the role operation logic 113 extends runtime operations, such as assignment, boxing/unboxing, identity, equality, and the like.

In an embodiment, the role operation logic 113 extends one or more assignment operations. In embodiments, a role base type (e.g., Systenn.Role<TUnderlyingType>) establishes a relationship between the role type and underlying type, to extend assignment rules of the runtime 107. In embodiments, the role operation logic 113 allows assignment from an underlying type to a role type, and from a role type to any type that its underlying type can be assigned to (e.g., base type and implemented interface). Using the role declaration of Example 1, Example 3 demonstrates an assignment operation:
   UnderlyingType underlyingReference=new UnderlyingType ( );
   MyRole r1=underlyingReference;

EXAMPLE 3

In Example 3, the relationship between MyRole and UnderlyingType that was established in Example 1 (i.e., that MyRole is a role that extends UnderlyingType) allows for the assignment from an object of type UnderlyingType (i.e., referenced by underlyingReference) to a local of type MyRole (i.e., r1), even though MyRole is neither a base type, nor an interface implemented by UnderlyingType. In embodiments, this new reference leaves the original object untouched.

In an embodiment, the role operation logic 113 extends one or more boxing/unboxing operations. Boxing is the process of converting an underlying type to a type to which it is being cast or assigned, while unboxing reverses this conversion. For example, referring to .NET and the CLR, conventionally, boxing is the process of converting a value type to the type "object", or to any interface type implemented by the value type. When the CLR boxes a value type, it wraps the value inside a System.Object instance, and stores that System.Object instance on a heap. During unboxing, the CLR extracts the value type from the System.Object instance. In embodiments, role types have a corresponding boxed type, and the role operation logic 113 allocates these boxed types during a boxing operation (e.g., in response to assignment or casting of a role type into an interface type). In embodiments, this boxed type can be assigned to an interface that the role implements. For instance, Example 3 demonstrated assignment of an instance of UnderlyingType to a local of type MyRole (i.e., r1). Via boxing, the role operation logic 113 can box that instance of UnderlyingType into a wrapper that allows an assignment of the local r1 to a local of type Interface2, which is implemented by MyRole (see Example 1). Thus, role operation logic 113 modifies boxing operations to enable an assignment as shown in Example 4:

Interface2 i2=r1;

EXAMPLE 4

In an embodiment, the role operation logic 113 extends one or more identity and equality operations. In embodiments, if either (or both) operand is a boxed type, equality is computed by first unboxing any boxed operand(s), and then applying the conventional rules for equality on the resulting values. In embodiments, the role operation logic 113 evaluates a reference to a role as being equal to a reference to an instance of an object extended by the role. For instance, Example 3 demonstrated assignment of an instance of UnderlyingType to a local of type MyRole (i.e., r1). In embodiments, when evaluating quality of a reference to the instance of UnderlyingType and the local r1, the role operation logic 113 indicates that there is an equality. For example, since the role operation logic 113 is aware of the layout of the role's boxing type, the role operation logic 113 can implement an equality determination based on unwrapping the role box and comparing the underlying instance against the target reference. This is in contrast two conventional wrappers, which would include references to two different objects memory (i.e., the wrapper object and the wrapped object).

In an embodiment, the role operation logic 113 extends one or more type constraint operations. For example, in embodiments, the role operation logic 113 is extended to enable a constrained invocation such as shown in Example 5, which substitutes Role for T:

void MUnderlyingType<T>(T t) where T:UnderlyingType { }
void MBaseType<T>(T t) where T:BaseType { }

EXAMPLE 5

Figure 3:
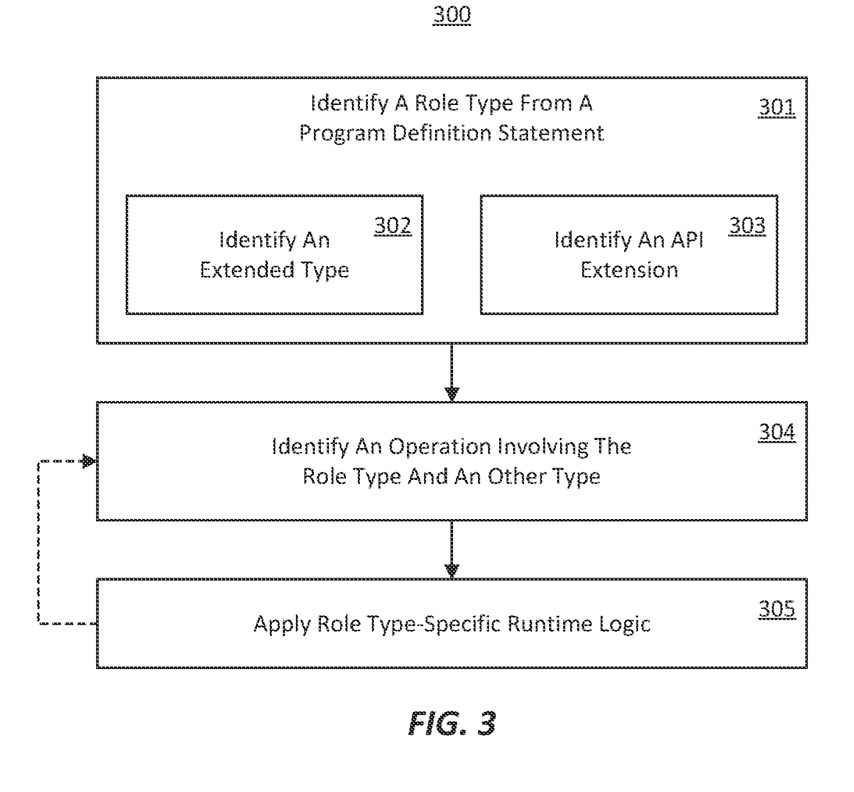
FIG. 3 illustrates a flow chart of an example method for utilizing role types that extend underlying types.

Embodiments are now described in connection with FIG. 3, which illustrates a flow chart of an example method 300 for utilizing role types that extend underlying types. In embodiments, instructions for implementing method 300 are encoded as computer-executable instructions (e.g., role type component 108) stored on a computer storage media (e.g., storage media 104) that are executable by a processor (e.g., processor 102) to cause a computer system (e.g., computer system 101) to perform method 300.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Method 300 comprises an act 301 of identifying a role type from a program definition statement. In some embodiments, act 301 comprises, within a program definition, identifying a statement including a role type that extends an underlying type. In an example, the role type identification component 110 identifies, from program definition 109, a declaration of role type 207, which extends underlying type 201 (e.g., "role MyRole:UnderlyingType, Interface2 { . . . }", as demonstrated in Example 1, where the role type is "MyRole" and the underlying type is "UnderlyingType"), or use of a role instance 212 (e.g., "MyRole r1= underlyingReference", as demonstrated in Example 3, where the role instance is "r1").

In embodiments, the underlying type is declared as sealed, which is something that would not be possible with conventional inheritance.

In embodiments, the underlying type is one of a reference type (e.g., class, interface) or a value type (e.g., struct.).

In embodiments, the underlying type is declared as inheriting (e.g., inherits 202) from a base type (e.g., "class UnderlyingType:BaseType, Interface) { . . . }", as demonstrated in Example 1, in which the base type is "BaseType").

As shown, act 301 comprises and act 302 of identifying an extended type, and an act 303 of identifying an API extension. In embodiments act 302 comprises identifying an underlying type that implements a first interface. For example, the extended type component 111 identifies underlying type 201, which implements interface(s) 205 as part of API 204 (e.g., "class UnderlyingType:BaseType, Interface) { . . . }", as demonstrated in Example 1, in which the first interface is "Interface"). In embodiments, act 303 comprises identifying a second interface implemented by the role type. For example, the added API component 112 identifies the API 209 added by role type 207, including interface(s) 210 (e.g., "role MyRole: UnderlyingType, Interface2 { . . . }", as demonstrated in Example 1, where second interface is "Interface2").

Method 300 also comprises an act 304 of identifying an operation involving the role type and another type. In an example, role operation logic 113 identifies an operation involving role type 207 and some other type, such as an instance of underlying type 201, or a type required by a consumer 213. Method 300 also comprises an act 305 of applying role type-specific runtime logic. In an example, based on identifying the operation involving the role type and the other type, the role operation logic 113 operates perform an operation that involves a role types. As shown demonstrated by broken arrow between act 304 and act 305, these acts can repeat any number of times, in order to apply role type-specific runtime logic to various types of operations involving the role type.

In some embodiments of act 304, the statement identified in act 301 assigns an object of the underlying type to the role type (e.g., "MyRole r1=underlyingReference", as demonstrated in Example 3). In some embodiments, based on the role type extending the underlying type, act 305 comprises assigning the object of the underlying type to the role type. In embodiments, based on assigning the object of the underlying type to the role type, the role type is usable to interact with the object of the underlying type using both the first interface and the second interface. For example, role instance 212 is usable to interact with both interface(s) 205 of underlying type 201, as well as interface(s) 210 of role type 207. As a result, in embodiments, the role type is reported as an instance of the first interface, and as an instance of the second interface.

In some embodiments of act 304, the statement identified in act 301 assigns the role type to another type (e.g., "Interface2 i2=r1;", as demonstrated in Example 4). In some embodiments, act 305 comprises allocating a wrapper object around the object of the underlying type. For example, the role operation logic 113 "boxes" the object of the underlying type into a boxed type to facilitate the assignment.

In some embodiments of act 305, allocating the wrapper object around the object of the underlying type comprises allocating a plurality of wrapper objects, and the role operation logic 113 reports reference equality between the plurality of wrapper objects (even though they are different objects in memory). For example, if the role type supports generics, this could result in a plurality of wrapper objects (each for a different possible type), and the role operation logic 113 treats these wrapper objects as having reference equality with one another.

In some embodiments of act 304, the statement identified in act 301 compares a wrapper object and the object of the underlying type. In some embodiments, act 305 comprises reporting reference equality between the wrapper object and the object of the underlying type. For example, referring to Examples 3 and 4, comparing underlyingReference and i2 indicates equality, even though underlyingReference has been boxed/wrapped in order to make the assignment to i2.

In some embodiments of act 304, the statement identified in act 301 assigns the role type to another type, and act 305 comprises determining that the underlying type is assignable to the other type and assigning the role type to the other type. For example, referring to Example 3, if role r1 is being assigned to a type that UnderlyingType can be assigned to, then the role operation logic 113 permits the assignment. Referring to Example 1, this other the other type could comprise one of a base type that is inherited by the underlying type (e.g., BaseType), or the first interface (e.g., Interface1).

As illustrated in example 200, the API 209 can include both interface(s) 210 and method(s) 211. Thus, in some embodiments, the role type extends the underlying type with an additional method member.

As discussed, in embodiments, role types re-implement all the interfaces of the underlying type (without requiring developers to write glue code), by forwarding to the underlying type through using constrained calls. Thus, in embodiments, the role type re-implements the first interface based on a constrained call to the object of the underlying type.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a", "an", "the", and "said" are intended to mean there are one or more of the elements. The terms "comprising", "including", and "having" are intended to be inclusive and mean that there may be additional elements other than the listed elements.

What is claimed:

1. A method, implemented at a computer system that includes a processor, for utilizing role types that extend underlying types at a runtime executing on the processor, the method comprising:
    at the runtime, identifying a first statement within a program definition, the first statement assigning an object of an underlying type to a role type that extends the underlying type, wherein:
        the underlying type implements a first interface, and
        the role type implements a second interface;
    at the runtime, assigning the object of the underlying type to the role type based on the role type extending the underlying type, wherein, based on assigning the object of the underlying type to the role type, the role type is usable to interact with the object of the underlying type using both the first interface and the second interface;
    at the runtime, reporting reference equality in response to identifying a second statement comparing a first reference to an object of the role type and a second reference to the object of the underlying type; and
    at the runtime, allocating a wrapper object around the object of the underlying type.

2. The method of claim 1, wherein the underlying type is declared as sealed.

3. The method of claim 1, wherein the underlying type is one of a reference type or a value type.

4. The method of claim 1, wherein the underlying type is declared as inheriting from a base type.

5. The method of claim 1, wherein allocating the wrapper object around the object of the underlying type is in response to identifying a third statement assigning the role type to another type.

6. The method of claim 5, further comprising:
    identifying a fourth statement comparing the wrapper object and the object of the underlying type; and
    reporting reference equality between the wrapper object and the object of the underlying type.

7. The method of claim 5, wherein allocating the wrapper object around the object of the underlying type comprises allocating a plurality of wrapper objects, and wherein the method further comprises:
    reporting reference equality between the plurality of wrapper objects.

8. The method of claim 1, further comprising:
    identifying a third statement assigning the role type to a second type;
    determining that the underlying type is assignable to the second type; and
    assigning the role type to the second type.

9. The method of claim 8, wherein the second type comprises one of:
    a base type that is inherited by the underlying type; or
    the first interface.

10. The method of claim 1, wherein the role type extends the underlying type with an additional method member.

11. The method of claim 1, wherein the role type re-implements the first interface based on a constrained call to the object of the underlying type.

12. The method of claim 1, further comprising:
reporting the role type as an instance of the first interface, and as an instance of the second interface.

13. A computer system for utilizing role types that extend underlying types at a runtime, comprising:
a processor; and
a computer storage media that stores computer-executable instructions that are executable by the processor to cause the computer system to at least:
at the runtime, executing on the processor, identify a first statement within a program definition, the first statement assigning an object of an underlying type to a role type that extends the underlying type, wherein:
the underlying type implements a first interface, and the role type implements a second interface;
at the runtime, assign the object of the underlying type to the role type based on the role type extending the underlying type, wherein, based on assigning the object of the underlying type to the role type, the role type is usable to interact with the object of the underlying type using both the first interface and the second interface;
at the runtime, report reference equality in response to identifying a second statement comparing a first reference to an object of the role type and a second reference to the object of the underlying type;
at the runtime, allocate a wrapper object around the object of the underlying type.

14. The computer system of claim 13, wherein allocating the wrapper object around the object of the underlying type is in response to identifying a third statement assigning the role type to another type.

15. The computer system of claim 14, the computer-executable instructions also including instructions that are executable by the processor to cause the computer system to:
identify a fourth statement comparing the wrapper object and the object of the underlying type; and
report reference equality between the wrapper object and the object of the underlying type.

16. The computer system of claim 14, wherein allocating the wrapper object around the object of the underlying type comprises allocating a plurality of wrapper objects, and wherein the computer-executable instructions also include instructions that are executable by the processor to cause the computer system to:
report reference equality between the plurality of wrapper objects.

17. The computer system of claim 13, the computer-executable instructions also including instructions that are executable by the processor to cause the computer system to:
identify a third statement assigning the role type to a second type;
determine that the underlying type is assignable to the second type; and
assign the role type to the second type.

18. The computer system of claim 13, wherein the role type extends the underlying type with an additional method member.

19. The computer system of claim 13, wherein the role type re-implements the first interface based on a constrained call to the object of the underlying type.

20. A hardware storage device that stores computer-executable instructions that are executable by a processor to cause a computer system to utilize role types that extend underlying types at a runtime executing on the processor, the computer-executable instructions including instructions that are executable by the processor to cause the computer system to at least:
at the runtime, identify a first statement within a program definition, the first statement assigning an object of an underlying type to a role type that extends the underlying type, wherein:
the underlying type implements a first interface, and the role type implements a second interface;
at the runtime, assign the object of the underlying type to the role type based on the role type extending the underlying type, wherein, based on assigning the object of the underlying type to the role type, the role type is usable to interact with the object of the underlying type using both the first interface and the second interface;
at the runtime, report reference equality in response to identifying a second statement comparing a first reference to an object of the role type and a second reference to the object of the underlying type; and
at the runtime, allocate a wrapper object around the object of the underlying type.

* * * * *